Dec. 9, 1969 A. H. SCHROEDER, JR 3,482,726
PRESSURE WELD SEAL FOR A COMPOSITE GLASS BODY
AND METHOD OF FORMING SAID SEAL
Filed Feb. 13, 1967

INVENTOR
Arthur H. Schroeder, JR

By A. G. Douvas.
Attorney

United States Patent Office 3,482,726
Patented Dec. 9, 1969

3,482,726
PRESSURE WELD SEAL FOR A COMPOSITE GLASS BODY AND METHOD OF FORMING SAID SEAL
Arthur Henry Schroeder, Jr., 11339 W. 62nd St., La Grange, Ill. 60525
Filed Feb. 13, 1967, Ser. No. 615,463
Int. Cl. H01k 1/28, 1/42; H01j 63/04
U.S. Cl. 220—2.3     8 Claims

ABSTRACT OF THE DISCLOSURE

This disclosure relates to a pressure weld seal for joining the peripheral edges of large sections at least one of which is a glass or ceramic body. Such seals are used in the fabrication of the envelopes for electron discharge devices, such as, cathode-ray tubes. A pressure weldable flange is affixed to the edge of each section to be joined, with each weld flange portion being in a plane different from that of the associated peripheral edge, and thereafter mating portions of both flanges are joined by a continuous pressure weld. A decoupling flange portion is provided to relieve stresses which would otherwise appear at the seal.

BACKGROUND OF THE INVENTION

Field of the invention

This invention relates generally to the fabrication of glass, metal or ceramic articles by using pressure welding techniques, and in a specific aspect to methods for hermetically welding the envelope sections for cathode-ray tubes and other such discharge devices having large peripheral hermetically sealed areas.

Description of the priort art

The pressure welding of ductile metals is a well known and common process. It has been found that a true metallurgical weld is produced between ductile metal members when high pressure is applied to clean surfaces of the metal members. Generally, high pressure is exerted by weld tool indentors, which act on weldable metal flanges, sufficiently to cause a flow of metal in the area being welded.

The sealing of glass, metal or ceramic articles by an intermediate glass sealing process is also a well known and common process. A process of direct glass to glass fusion is another common process for sealing articles together. Such processes involve the fusion of glass between the glass, metal or ceramic articles to be joined. Where high temperatures are not restrictive, a higher softening point glass is used to form the seal; and where higher temperatures are restrictive, a low softening point glass is used between the members to be sealed. Such processes involve a careful selection of materials with closely matched thermal expansion properties.

In the manufacture of large cathode-ray tubes, television picture tubes and the like, direct glass to glass fusion has been useful. Its application involves the formation of a hermetic seal around the large periphery of the glass funnel and glass face plate panel, which commonly ranges between 50 to 70 inches in length. The seal must be continuous and leak free, because the operation and life of the finished tube depends on the maintenance of a high vacuum inside. It has been proposed in U.S. Patent 2,889,952, issued to S. A. Claypool, that a low softening point, devitrifying type glass be used in the fusion sealing of glass, metal or ceramic articles. While this sealing technique has been successful, it does require a low temperature glass fusion. The use of glass fusion for sealing requires a relatively long processing cycle, commonly involving bakeout, fusion and stress relieving thermal treatments. In cases, such as the color television picture tubes, the heat required for joining the glass members is detrimental to heat sensitive coatings that are applied to the glass members.

In most cases, the heat necessary to join the glass members limits the manufacturing process to completing the articles after the seal is formed. One of the disadvantages of the glass fusion sealing techniques is its limitation in final sealing process for evacuated devices. Generally, a separate vacuum pump-out cycle is used as a post operation to the glass fusion sealing operation. This is accomplished through a small diameter glass tube that can be closed by a flame, or pinch off type operation. Consequently, the article is not tested, just prior to making the large peripheral seal.

If tests show a defect in the final evacuated tube, it is often necessary to reprocess the finished article by separating the fused glass seal between the funnel and panel. In the present soft glass fusions method for sealing the funnel and panel members, because a high precentage of parts require defect corrections, complex techniques have been devised for separating the sealed areas and effecting reprocessing. U.S. Patent 3,058,323, issued to S. A. Claypool, describes one of these methods.

SUMMARY OF THE INVENTION

It has become readily apparent within recent years that an improved hermetic sealing weld and process therefor is required for large composite articles, such as, cathode-ray tubes, television picture tubes and the like. The present steps for preparing the panel to funnel weld are too delicate and time consuming; and in the event the completed tube is defective, the disassembly for repair of salvage is just as burdensome.

Accordingly, a principal object of this invention is to facilitate and simplify the process for welding such tube sections and, if necessary, for disassembling the resulting tube envelope for reprocessing.

Another object is to provide an improved method whereby a second and third weld option is feasible when reprocessing becomes necessary to a production cycle salvage value.

Briefly, the foregoing objects are attained by affixing pressure weldable metal flanges, for example, to each of the panel and funnel sections of a large cathode-ray tube. Both flanges are circularly formed so that one fits closely within the other for the purpose of self-alignment. Each flange includes an elongated decoupling portion which relieves the strains otherwise transmitted to the tube glass sections by the welding steps. Each weld flange is also extended in length so that second and third weld operations can be performed during reprocessing if desired.

A pressure weld tool consisting of a single weld tool indentor acting against a flat die surface in position continuously around the periphery of the cathode-ray tube forms a hermetic metal to metal weld. In particular, the two flanged assemblies are placed in a weld tool vacuum chamber, evacuated, and hermetically sealed by pressure welding.

The manufacturing process steps currently in use in forming the fused glass seal between the panel and funnel are eliminated by the present invention. The bakeout cycle is incorporated in the final processing when the vacuum chamber and weld tool is heated to a desired temperature.

Defects which can affect the operational life of the cathode-ray tube may not be apparent at the time of final sealing. The relative costs of the component parts of the tube are substantial enough to make a salvage, or rework step, desirable. In the present invention the weld flange is provided with sufficient length to allow one or more pressure weld options. The salvage process would need only a trim of the weld section to effectively reclaim the tube components.

Subsequent resealing of the tube is accomplished by a weld tool of slightly smaller dimension.

DESCRIPTION OF THE DRAWINGS

In order that all of the structural features for attaining the objects of this invention may be readily understood reference is herein made to the accompanying drawings, wherein.

DESCRIPTION OF THE PREFERRED EMBODIMENTS

Figure 1:
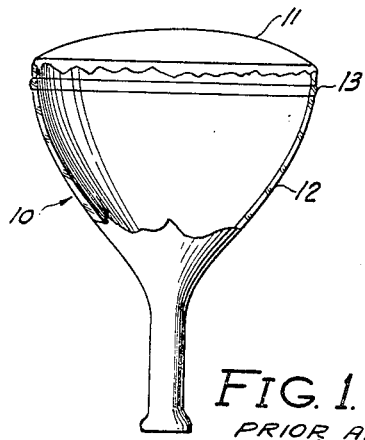
FIG. 1 illustrates a composite article comprising a funnel member and a panel member sealed by a sealing glass as in the prior art and forming the body of a cathode-ray tube.

Referring to the drawings, FIG. 1 shows a cathode-ray tube 10 having a panel member 11 sealed to a funnel member 12. The seal 13 is a glass to glass fusion and can be a direct fusion of the glass funnel and glass panel member, or a sealing-glass fusion between glass, metal or ceramic members. This common prior art sealing technique involves higher temperatures, which bring sealed areas to a glass fusion temperature.

Figure 2:
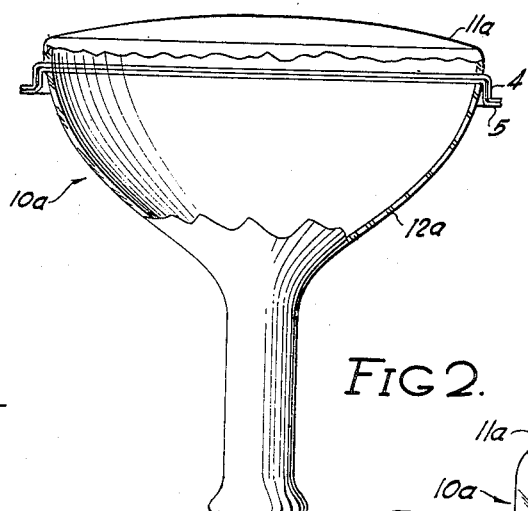
FIG. 2 illustrates a cathode-ray tube with mating pressure weldable metal flanges on the funnel and panel members of the tube in accordance with the present invention.

In FIG. 2 a panel member 11a for cathode-ray tube 10a is provided with a pressure weldable metal flange 4, and a funnel member 12a is provided with a pressure weldable metal flange 5 is accordance with the present invention. Each member and its flange is a pre-assembly which is hermetically sealed by well established practices dictated by the type of materials used. In the case of glass, a metal flange of pressure weldable material is sealed by a direct glass to metal sealing operation. In the case of metal, a forming operation can provide a weldable flange, or a weldable flange can be brazed, soldered, welded, or sealed by other established practices. Metal flanges are normally brazed when the material is ceramic.

Figure 3:
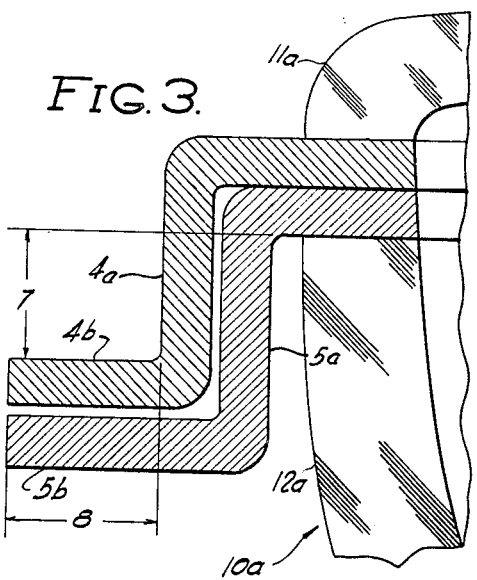
FIG. 3 illustrates an enlarged cross-section of the mating pressure weldable metal flanges of FIG. 2.

In FIG. 3 the enlarged cross-section shows a preferred design for metal flange 4 and a metal flange 5. Both flanges are formed so that one fits closely within the other for the purpose of self-alignment. Decoupling flange portions 4a, 5a defined by distance 7 are provided to allow for the movement of metal during pressure welding. The decoupling flange portions 4a, 5a also provide a cylindrical surface that is useful for locating the members in the pressure welding tools. Weld flange portions 4b, 5b defined by distance 8 are provided as shown and are arranged so as to present pressure weldable surfaces in contact. The weld flanges 4b, 5b can be extended in length, so that a second and third weld operation can be performed if desired.

Figure 4:
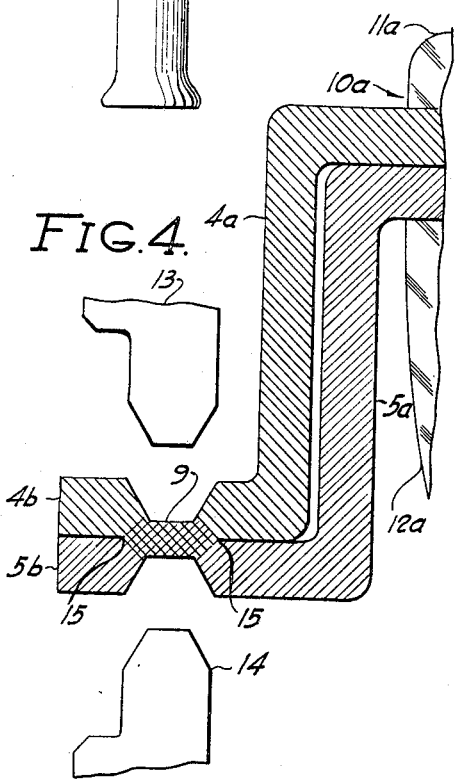
FIG. 4 illustrates a cross-section of a pressure weld, formed by using opposed weld tool indentors.

In FIG. 4 a cross-section shows a pressure weld joint 9 which is formed by the action of weld die indentors 13, 14 penetrating the weld flange portions 4b, 5b. The preferred amount of penetration has been found to be between 70% and 75% of the thickness of the flanges to be welded. Considerations, other than for pressure welding may make more or less weld die penetration necessary. A second weld operation is accomplished by trimming the weld joint 9 at a point just inside of the weld and subsequently welding a similar but slightly smaller diameter weld tool.

For a more specific illustration of my invention a discussion of pressure welding principles will be of aid. The technology of joining similar or dissimilar metal flanges by pressure welding has been recognized to embody three principal subjects. These are: the materials to be joined, their surface cleanliness, and the weld tool configuration. It has been found that the weld quality diminishes when any of these three are at less than optimum. A weld quality concept is herein conveyed, which establishes the principles for the applied technology of pressure welding metal flanges.

An optimum material in common use for pressure welding is copper with a nickel, or electroless nickel plating. An optimum weld tool configuration is one that is perfectly aligned and achieves equal penetration into the flanges being welded. FIG. 4 shows a pressure weld joint that is achieved when all conditions are at or near the optimum. The points, at which a true metallurgical bond begins, 15 are described as the beginning of the pressure weld.

Figure 5:
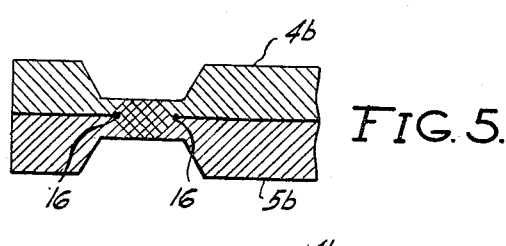
FIG. 5 illustrates the same as FIG. 4 but showing a lower quality weld.

In the optimum case of FIG. 4, the weld points 15 are out past the point of maximum reduction. By holding the material and weld tool configuration at optimum and increasing the level of contamination the weld points 15 move into the area of maximum reduction. Further increases of contamination levels serve to move the weld points closer together until they touch. When the weld points touch, a continuous line will exist through the weld and no welding will have resulted. By holding the cleanliness and weld tool configuration near the optimum, and using materials less than optimum, a similar reduction in weld quality occurs. FIG. 5 shows a pressure weld joint similar to that actually achieved in welding nickel to copper. The weld points 16 are in past the point of maximum reduction.

Ferrous alloys and stainless steel are substantially less than optimum. Microscopic examination of flange welds where these materials are used show that the weld points are almost touching. This is under the best condition of cleanliness and weld tool configuration. Past work with these alloys has not produced reliable cold pressure flange welds and the weld quality is poor.

By holding the material and cleanliness at optimum, and using poor weld tool configurations, again a similar reduction in weld quality occurs. This is a result of weld die indentors that may be too wide, too narrow, round, sharp, or other such construction, which does not impart the best pressure producing conditions for welding.

Concerning these three principal subjects, it can readily be seen that when any one is less than the optimum, the other two are even more critical. When nickel is used in pressure welding in place of copper, greater care is needed in maintaining cleanliness. When a specific application requires a narrow weld tool, the cleanliness problem increases. When clean surfaces cannot be maintained due to processing, the material and weld tool configuration need be as near optimum as is possible. The resulting weld has a quality that is effected by the three subjects discussed. Even in a poor quality weld, the usual tests for leak tightness indicate a no leak detectable. As shown in FIG. 5, the weld points 16 can be almost touching and yet there will be a continuous metal barrier, which does form a hermetically sealed container.

Figure 6:
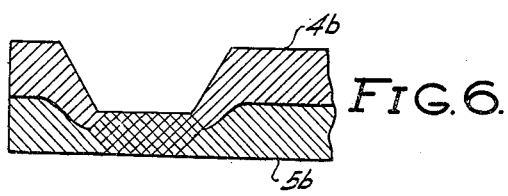
FIG. 6 illustrates a cross-section of a pressure weld formed by a single weld tool acting against a flat tool surface.

FIG. 6 shows a typical flange weld joint formed by a single tool acting against a flat tool surface. This tool arrangement is close to the optimum and has an advantage in that the weld die alignment problems are substantially reduced. The past use of this type of weld tool for hermetically welding small containers has been restricted because somewhat more metal is moved. By using a longer decoupling flange, less stress is placed on the glass to metal seal area which joins the metal flange to the glass body. It has been found that the indentor-anvil type weld tool is practical when the larger decoupling flange design can be allowed.

By way of a more detailed description of my invention, reference is made to the formation of a pressure welded hermetic seal formed on the large periphery of a 23 inch rectangular color television picture tube. The requirement of pressure weldable metal flanges necessitates that metal flanges first be sealed to the glass funnel and panel members. Several glass-to-metal sealing techniques are available, covering compression type seals, matched expansion type seals and even the intermediate solder glass type seals presently used for sealing the funnel and panel member directly. Considering the design of the metal flanges, the material best for pressure welding is copper. Since copper is poor material for glass sealing, a laminated material containing copper on one side can be useful.

In the case of a matched expansion glass-to-metal seal, a copper clad nickel-iron-cobalt alloy presents a matched expansion alloy surface to the glass, and a copper surface on the opposite side would be available for pressure welding. A similar arrangement can be applied to a compression type glass-to-metal seal, where a copper clad steel is used instead. Additionally, the funnel member could be constructed entirely of metal and the panel member could consist of a heavy metal frame of which a weldable metal flange would be an integral part.

Considering the mechanical design of pressure weldable metal flanges, it is necessary to allow sufficient decoupling for the movement of metal during welding. It has been found that without decoupling, as in the case of flat sheet stock, the inward movement of metal on a closed circle results in a buckling or pillowing of the flat stock. A slight amount of decoupling, such as an amount equal to the thickness of the stock being welded, will so reduce the buckling distortion as to place very little stress on the horizontal plane.

In the case of glass-to-metal seals where the metal flange is without decoupling, the pressure welding would move metal toward the seal. The seal area would become highly stressed and fracture. A slight decoupling, such as that equal to one weld flange thickness, would reduce the stress somewhat, but a glass-to-metal seal failure would still be likely. By using a decoupling of at least four times the weld flange thickness the stress on the glass-to-metal seal resulting from pressure welding would be small. Where weldable metal flanges are in the close proximity to glass-to-metal seals, decoupling of at least four times weld flange thickness should be used. In the case of a weld flange of .015" thickness, decoupling should be .060" minimum. A study of FIG. 4 reveals a decoupling of approximately four times weld flange thickness.

When glass-to-metal seals are not in the close proximity of the weld flange, decoupling on the order of at least one flange thickness can be used. Here if the weld flange is .015" thick, the decoupling should be .015" minimum. This would be the case where the funnel and panel members are substantially of metal construction.

In both cases above, the decoupling flange and the weld flange is shown as being equal in thickness. Pressure welding imposes no design requirements regarding the thickness dimensions. In the welded section, the reduction of metal results in a work hardened area having a thin section just immediate to the weld. In FIGS. 5 and 6 it can be seen that the reduction of two .015" flanges to .009" results in a minimum section metal thickness of .0045". This is shown as an ideal cross-section where weld tool indentors have penetrated equally in perfect alignment. It has been found in practice that die penetration is not usually equal. In the case of two .015" flanges reduced to .009" in a welded section, the penetration actually achieved usually results in thin sections of .005" to .004" just immediate to the weld.

Concerning weld flange design, the minimum length depends on the weld tool indentor used. It has been found that the width of the weld tool indentor can be greater than the weld flange thickness. In the case of a weld flange .015" in thickness, the weld tool is best established at .015" to .025". The length of the weld flange is to be such that it extends out over the weld tool indentor. Since the tool indentors have, in addition to the .015" to .025" width, angles and radii, the weld flange should be .040" or more in length to provide enough flange for a single pressure weld.

When weld flanges are designed for a second or third weld option, the length of the weld flange should be increased. The provision of added weld flange length for more than one weld should take account of the decoupling flange design also. In the case where a second weld option is deemed necessary for a production process, and where weld flanges are .015" in thickness, the length of the weld flange should be increased by .040" and the decoupling flanges increased by two times the material thickness or .030".

From the foregoing discussion on flange design a preferred design can now be discussed, which allows a hermetic pressure welding process to be applied to large peripheral sealed areas, said process to achieve a high weld quality and yield. The best conditions for pressure welding large peripheral flanges include a copper material in the form of a clad laminate. For a matched expansion glass-to-metal seal, a copper clad nickel-iron-cobalt alloy is required. The thickness of copper can range between a thin electro deposited coating to a heavier cladding. A commonly used laminate is 30% copper, 70% nickel-iron-cobalt. The preferred weld and decoupling flange thickness is .015" which then yields about .004" copper (30%) for pressure welding. The weld flanges would be pre-sealed to the glass funnel and glass panel with the formation of a glass-to-metal seal between the glass and the nickel-iron-cobalt side of the copper clad laminate. The weld flanges would be provided in a clean condition, electro plated with nickel or electroless nickel plated to a thickness of approximately .0001" to .0002".

The preferred decoupling flange dimensions is to be a minimum of four times flange thickness or .060", and the preferred weld flange length is set at .050" for a single weld operation. When a second and third weld option is desired, additional weld flange lengths of .040" should be provided.

Given the preferred flange design, a pressure weld tool consisting of single weld tool indentor acting against a flat die surface continuously around the periphery of the cathode-ray tube will form a hermetic metal to metal weld. The preferred weld tool is the single indentor, anvil type. The large rectangular shape of the television picture tube would make the matched and opposed die indentors difficult to manufacture and difficult to hold in alignment.

While the preferred design is considered best for the process, it can be seen that variations will produce essentially the same result, namely, a true hermetic metal to metal seal. Changes to other weldable materials, flange designs, or weld tool designs are possible and in no way are intended to limit the present invention to a best set of conditions.

With the provision of pressure weldable metal flanges, it can now be seen that a much improved process is provided. The cathode-ray tube can be processed and assembled in much the same manner as currently practiced. The panel and funnel members form two complete assemblies that, when pressure welded, yield a finished and tested cathode-ray tube. The two final assemblies are placed in a weld tool vacuum chamber, evacuated, tested and hermetically sealed by pressure welding. A defective part is removed from the chamber for reprocessing before the final seal is made.

The manufacturing process steps currently in use in forming the fused glass seal between the funnel and panel are eliminated by the present invention. The bakeout cycle is incorporated in the final process where the vacuum chamber and weld tool is heated to a desired temperature. This provides a vacuum bakeout condition which effectively reduces the time required for bakeout when accomplished at atmospheric pressure.

In the present invention the weld flange is provided with sufficient length to allow one or more pressure weld options. If the weld flange provided is of sufficient length for only one pressure weld, the salvage process would require the replacement of the flange. Where sufficient weld flange is provided for two or more welds, the salvage process would need only a trim of the welded section, to effectively reclaim the tube components. Subsequent resealing of the tube is accomplished by a weld tool of slightly smaller dimensions. The resealing process of a reclaimed, or salvaged cathode-ray tube is essentially the same as the initial sealing process. It is accomplished as the final operation after tests indicate the reworked unit to be acceptable.

In the foregoing teachings, the process has been established as a unique method for the final assembly of the cathode-ray tube components. It will be understood that the present invention allows the manufacturing sequences to be altered and that the process of forming a hermetic seal by pressure welding funnel and panel components need not be the final manufacturing step. It can be readily seen that numerous changes are possible in the manufacturing sequences, the weldable metal flange material and shape, and the design and materials used for the funnel and panel members of the cathode-ray tube.

What is claimed is:

1. The method of hermetically joining two bodies, at least one of which is formed from a material selected from the group consisting of glass and ceramic materials, and in which the bodies have large continuous peripheral edges to be joined, comprising affixing to each of said bodies a continuous pressure weldable metal flange along the continuous peripheral edge of each of the bodies, each of the flanges including a continuous weld flange portion remote from its associated body and a continuous stress decoupling flange portion less remote from its associated body, the weld flange portions being substantially radial to the associated body with each weld flange portion being in a plane different from that of the associated peripheral edge and each decoupling flange portion being substantially concentric to the associated body, and placing the weld flange portions of both flanges in a mutually contacting and permanent relation by applying continuous and simultaneous pressure to both of said weld flange portions sufficient to create a solid phase metallic bond at the pressurized weld flange areas.

2. The method of claim 1 in which the weld flange portion and the stress decoupling flange portion of each flange are at a substantially normal angle one to the other in cross-section.

3. The method of claim 2 in which the decoupling flange portion of one flange is within the peripheral confines of the other decoupling flange portion in a substantially close parallel relationship, and the weld flange portion of the one flange is immediately below the weld flange portion of the other flange in a substantially close parallel relationship.

4. The method of claim 3 in which one of said bodies is a glass panel for the envelope of an electron discharge tube, and the other of said bodies is a glass or metal funnel for said tube.

5. A composite device comprising two large preformed bodies, at least one of which is formed from a material selected from the group consisting of glass and ceramic materials, with the bodies having large continuous peripheral edges hermetically joined by a continuous metal bond, a continuous pressure weldable metal flange affixed to each body and having a peripheral configuration corresponding to a body edge to which it is joined, each of said flange including a continuous weld flange portion remote from its associated body and a stress decoupling flange portion less remote from its associated body, the weld flange portions being substantially radial to the associated body with each weld flange portion being in a plane different from that of the associated peripheral edge and pressure welded one to the other and the decoupling flange portions being substantially concentric to the associated body.

6. The device of claim 5 in which the weld flange portion and the stress decoupling flange portion of each flange are at a substantially normal angle one to the other in cross-section.

7. The device of claim 6 in which the decoupling flange portion of one flange is within the peripheral confines of the other decoupling flange portion in a substantially close parallel relationship, and the weld flange portion of the one flange is immediately below the weld flange portion of the other flange in a substantially close parallel relationship.

8. The device of claim 7 in which one of said bodies is a glass panel for the envelope of an electron discharge tube, and the other of said bodies is a glass or metal funnel for said tube.

References Cited

UNITED STATES PATENTS

| 2,736,090 | 2/1956 | Sowter et al. | 29—470.1 |
| 2,818,637 | 1/1958 | Roberts | 29—472.5 |
| 2,936,924 | 5/1960 | Blanding et al. | 65—59 XR |

S. LEON BASHORE, Primary Examiner

SAUL R. FRIEDMAN, Assistant Examiner

U.S. Cl. X.R.

29—470.1, 471.9; 65—58, 59; 287—189.365